Feb. 2, 1971    YASUYOSHI KITA    3,559,484
NURSING BOTTLE WITH BIMETAL THERMOMETER
Filed April 15, 1969
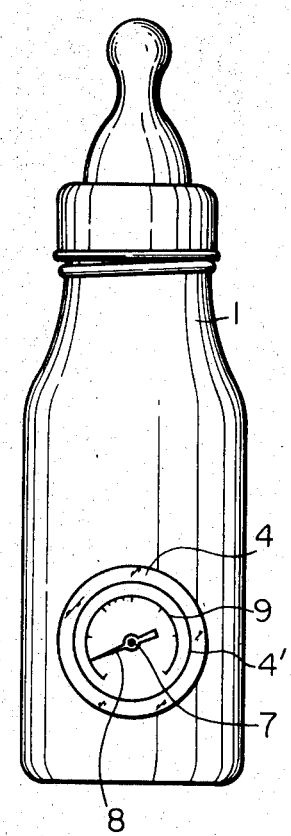
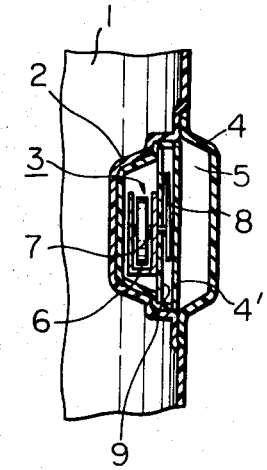

3,559,484
NURSING BOTTLE WITH BIMETAL THERMOMETER
Yasuyoshi Kita, 1-13-4 Hongo Bunkyo-ku, Tokyo, Japan
Filed Apr. 15, 1969, Ser. No. 816,294
Claims priority, application Japan, Apr. 22, 1968, 43/33,385
Int. Cl. G01k 1/14
U.S. Cl. 73—343      1 Claim

ABSTRACT OF THE DISCLOSURE

A nursing bottle having a bimetal thermometer which is accommodated within a recessed portion provided at a suitable position in the side wall of the bottle proper. The recessed portion is hermetically sealed off so as to prevent the ingress of outside hot or cool water into the bottle interior. The thermometer mounted in the recessed portion serves to indicate the temperature of the liquid (such as milk) contained in the bottle, making it easier to know an exact temperature of the content.

---

The invention is concerned with an improvement in a nursing bottle and has particular reference to a nursing bottle with means for examining the temperature of the liquid (which usually is milk) contained in the bottle, wherein said means uses a bimetal thermometer.

The temperature of a liquid contained in a nursing bottle is usually examined by a rule of thumb, i.e. by feeling with finger or it can be visually measured by alcohol or mercury thermometer mounted in the recess provided in the wall of the bottle. These however accompany certain drawbacks in that the former necessitates delicate experience and in the latter the thermometer is likely to be broken at washing and tends to indicate inexact temperature of the liquid since the thermometer itself is installed outside said bottle.

In order to cope with these problems the inventor has already proposed a nursing bottle provided with a washable bimetal thermometer in the recess provided in the side wall of the bottle, but this has proved to be still insufficient for indicating an exact temperature of liquid contained in the bottle.

This invention therefore contemplates the provision of a further improved nursing bottle using a bimetal thermometer which is capable of indicating invariably an exact temperature of the liquid in the bottle. The bimetal thermometer used in the nursing bottle of the invention is constructed to be completely water-tight and thus lasts for a prolonged period of time without involving a failure or damage thereto. Specifically, the nursing bottle implementing the invention is constituted by a bottle of known construction and material and with a recessed portion provided at a suitable position in the side wall thereof and a bimetal thermometer accommodated in said recessed portion which, after the mounting of the thermometer, is hermetically sealed off with a cover plate.

The advantages of the nursing bottle according to the invention will be understood more clearly from the following description of the invention taken in conjunction with the accompanying drawings, in which:

FIG. 1 is a side elevation of the bottle of the invention having a bimetal thermometer provided in the side wall thereof; and FIG. 2 is a partially cut-off view, on an enlarged scale, of the bimetal thermometer used in the bottle of FIG. 1.

Now referring to the attached drawings representing an example embodying this invention, the bottle proper 1, which is formed with hard plastic material such as polycarbonate resin, is provided with a recessed portion 2 of substantially circular shape, in which portion 2 is installed a bimetal thermometer 3. The recessed portion 2 accommodating therein the bimetal thermometer 3 is hermetically sealed off with a transparent cover plate 4 by means of ultrasonic melting leaving a hollow space 5 therein defined by the cover plate 4 and a transparent inner plate 4' of homogeneous plastic material, which inner plate 4' is installed between the cover plate 4 and recessed portion 2.

The bimetal thermometer 3 may be of known structure with the heat sensing part at the bottom and a transparent cover on the top. In the attached drawing is shown an example of such structure in which the thermometer 3 has a spiral bimetal 6 which is fixed at its outer end and connected at its inner end to a rotatably mounted shaft 7 which has at one extremity thereof a pointer 8 swivelling in the proximity of a graduated scale plate 9. The scale plate 9 can be advantageously provided with, in addition to the ordinary temperature scale, easily recognizable indications such as "cold," "adequate" and "hot."

With this structure, the temperature of the liquid contained in the bottle is indicated by the pointer 8 of the bimetal thermometer 3 on the scale plate 9 when liquid such as milk is poured in the bottle proper 1 and heated in a hot water basin or when the bottle containing hot liquid is dipped in water for cooling.

The nursing bottle of this invention, with the thermometer installed in a recessed portion provided in the side wall thereof provides for stronger construction and easier handling than the prior art nursing bottles with an alcohol or mercury thermometer which is provided on the outside of the bottle wall and which is readily broken in the course of washing. Furthermore, the bimetal thermometer is not affected by the temperature of heating or cooling basin due to the presence over said thermometer of a hollow space which prevents the direct contact of the outside hot or cool water with not only the heat sensing part but also the surface part of the thermometer.

Thus, the inherent advantage of the nursing bottle according to the invention enables the achievement of exact indications of the temperature of the liquid in the bottle and also prevents the intrusion of outside liquids into the bimetal thermometer so as to guarantee a long life-time of the bottle in its entirety.

I claim:

1. A nursing bottle comprising a recessed portion at a suitable position in the side wall of said bottle a bimetal thermometer accommodated in said recessed portion and having a heat sensing part located at its innermost position and a temperature indicating part located at its outermost position, a transparent cover plate mounted in said bottle to hermetically seal said recessed portion and a transparent inner plate mounted between said thermometer and said cover plate to define a hollow space between said plates so that said parts of the bimetal thermometer accommodated in said recessed portion are excluded from said hollow space, whereby said hollow space impedes heat transfer from the environment outside of said transparent cover plate to said bimetal thermometer.

References Cited
UNITED STATES PATENTS
| | | | |
|---|---|---|---|
| 2,755,666 | 7/1956 | Muncheryan | 73—343 |
| 3,460,389 | 8/1969 | Lamb | 73—363.7 |

FOREIGN PATENTS
| | | | |
|---|---|---|---|
| 17,743 | 8/1888 | Great Britain | 73—343.3 |

LOUIS R. PRINCE, Primary Examiner

D. E. CORR, Assistant Examiner